United States Patent
Vaajala et al.

(10) Patent No.: US 10,291,013 B2
(45) Date of Patent: May 14, 2019

(54) ADAPTIVE BATTERY PROTECTION

(71) Applicant: Nokia Technologies Oy, Espoo (FI)

(72) Inventors: Kristian Mikael Vaajala, Lieto (FI); Markus Antti Tapio Aaltonen, Piikkiö (FI); Kimmo Samuel Valo, Turku (FI)

(73) Assignee: Nokia Technologies Oy, Espoo (FI)

( * ) Notice: Subject to any disclaimer, the term of this patent is extended or adjusted under 35 U.S.C. 154(b) by 735 days.

(21) Appl. No.: 14/085,378

(22) Filed: Nov. 20, 2013

(65) Prior Publication Data
US 2015/0137618 A1 May 21, 2015

(51) Int. Cl.
| | |
|---|---|
| *H01H 83/00* | (2006.01) |
| *H02H 3/00* | (2006.01) |
| *H02H 3/093* | (2006.01) |
| *H02H 7/18* | (2006.01) |
| *G06F 1/20* | (2006.01) |
| *H01M 10/42* | (2006.01) |
| *H01M 10/44* | (2006.01) |
| *H02J 7/02* | (2016.01) |

(Continued)

(52) U.S. Cl.
CPC .......... *H02H 3/0935* (2013.01); *G06F 1/206* (2013.01); *H01M 10/425* (2013.01); *H01M 10/44* (2013.01); *H02H 7/18* (2013.01); *H02J 7/0029* (2013.01); *H02J 7/0083* (2013.01); *H02J 7/025* (2013.01); *H02J 50/20* (2016.02); *H02J 2007/0039* (2013.01); *Y10T 307/766* (2015.04)

(58) Field of Classification Search
USPC ........................................................ 307/131
See application file for complete search history.

(56) References Cited

U.S. PATENT DOCUMENTS

| | | | | |
|---|---|---|---|---|
| 4,163,190 A | * | 7/1979 | Moerman ............. | G05F 1/38 323/250 |
| 2008/0304199 A1 | | 12/2008 | Cruise et al. | |
| 2010/0176764 A1 | | 7/2010 | Tachikawa et al. | |

FOREIGN PATENT DOCUMENTS

| | | |
|---|---|---|
| CN | 101416330 A | 4/2009 |
| CN | 102570398 A | 7/2012 |
| CN | 102916456 A | 2/2013 |

(Continued)

OTHER PUBLICATIONS

Extended European Search Report received for corresponding European Patent Application No. 14191038.0, dated Mar. 24, 2015, 8 pages.

*Primary Examiner* — Fritz M Fleming
*Assistant Examiner* — Dru Parries
(74) *Attorney, Agent, or Firm* — Harrington & Smith (57) ABSTRACT

Methods and apparatuses, including computer program code are disclosed herein that provide adaptive battery protection. A method includes disabling a timer, when a current drawn by a battery-powered device from a battery is less than or equal to a lower current threshold. When the timer is disabled, the battery may remain connected to the battery-powered device. The method further includes enabling the timer when the current drawn from the battery is greater than the lower current threshold and less than an extended current threshold. When the timer is enabled, the timer may allow the battery to remain connected to the battery-powered device until the timer expires. The method further includes disconnecting the battery when the timer expires or when the current drawn from the battery exceeds the extended current threshold.

12 Claims, 4 Drawing Sheets

(51) Int. Cl.
*H02J 50/20* (2016.01)
*H02J 7/00* (2006.01)

(56) References Cited

FOREIGN PATENT DOCUMENTS

| | | |
|---|---|---|
| CN | 102929378 A | 2/2013 |
| EP | 2400368 A2 | 12/2011 |
| WO | 2012/029982 A2 | 3/2012 |

\* cited by examiner

ADAPTIVE BATTERY PROTECTION

The subject matter described herein relates to protecting a battery-powered device from over-current conditions that could cause damage to the battery-powered device or injury to a user of the device.

BACKGROUND

Many modern electronic devices are battery powered. Mobile devices are almost always battery-powered including a wide variety of consumer and industrial products, such as cell phones, handheld computing devices, laptops, and many other portable devices. As the features available in portable devices have increased, the power consumption of these devices has also increased. Increased power consumption has led to the possibility of overheating, which could result in damage to the device or injury to the user. For example, a hand-held cellular telephone that overheats could destroy the phone and/or injure the user's hand or face. Moreover, the increased complexity and capability of these devices has caused the normal power consumption to increase to a level where if the same amount of power were consumed due to a hardware or software failure, overheating could result and the overheating could cause injury.

SUMMARY

Methods and apparatuses, including computer program code are disclosed herein that provide adaptive battery protection.

In one aspect, there is provided a method. The method includes disabling a timer, when a current drawn by a battery-powered device from a battery is less than or equal to a lower current threshold. When the timer is disabled, the battery may remain connected to the battery-powered device. The method further includes enabling the timer when the current drawn from the battery is greater than the lower current threshold and less than an extended current threshold. When the timer is enabled, the timer may allow the battery to remain connected to the battery-powered device until the timer expires. The method further includes disconnecting the battery when the timer expires or when the current drawn from the battery exceeds the extended current threshold.

In some variations, one or more of the features disclosed herein including the following features can optionally be included in any feasible combination. The method may further include enabling the timer, when the current drawn from the battery is greater than the lower current threshold and less than a normal current threshold, wherein the enabled timer allows the battery to remain connected until the timer expires; and disconnecting the battery, when the timer expires or the current drawn from the battery exceeds the normal current threshold. The method may further include resetting the timer to prevent the expiration of the timer based on a first received indication. The first received indication may represent use of an apparatus drawing current from the battery. The timer may be disabled based on a second received indication.

In another aspect, there is provided a method. The method may include determining to send at least one reset signal comprising instructions to reset a timer at a battery pack.

In some variations, one or more of the features disclosed herein including the following features can optionally be included in any feasible combination. The method may further include determining to send at least one enable signal comprising instructions to enable the timer at the battery pack. The determining to send the at least one reset signal or determining to send the at least one enable signal may further include determining whether the battery pack supports an extended current mode or a normal current mode. The at least one enable signal or the at least one reset signal may be sent if the battery pack supports the extended current mode. The least one reset signal may be sent periodically.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Like labels are used to refer to same or similar items in the drawings.

DETAILED DESCRIPTION

The current available from many modern batteries is sufficient to cause damage to plastic components, injury to a user, or damage to the environment if a failure occurs that allows excessive current and/or overheating. For example, a short-circuit in a battery-powered mobile device could cause plastic components to melt, damage to the overheating electronic components, and in the worst case, a fire. Embodiments consistent with the subject matter disclosed herein may allow high current levels to be drawn from a battery in a battery-powered device while protecting the device from over current conditions that could cause damage or injury. Battery-powered devices (also referred to herein as a devices or battery-powered apparatuses) utilizing the subject matter disclosed herein may include a wide range of consumer and industrial devices, such as cellular telephones, smart phones, personal digital assistants (PDAs), netbooks, notebook computers, laptop computers, custom designed computing devices, industrial control devices, remote sensing devices, and any other battery-powered device.

Figure 1:
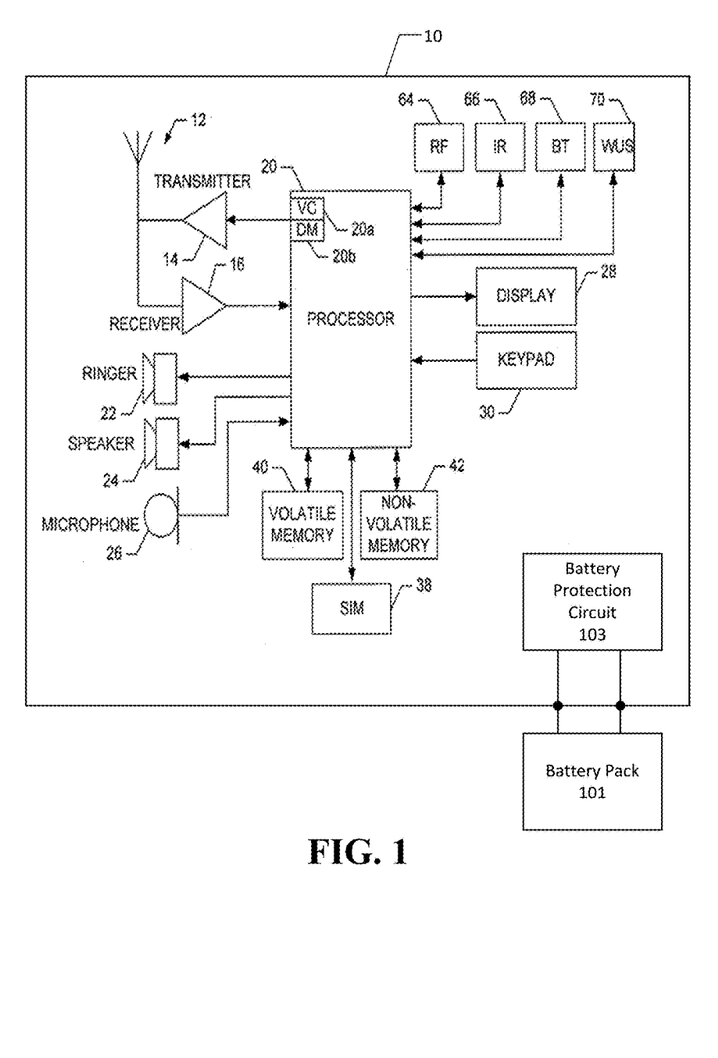
FIG. 1 depicts an example of a battery-powered device, in accordance with some example embodiments.

FIG. 1 illustrates a block diagram of an example of a battery-powered apparatus 10, in accordance with some embodiments. FIG. 1 depicts a battery-powered apparatus 10 comprising a user equipment, such as a cellular telephone, a smartphone, and the like.

In some example embodiments, the apparatus 10 may include battery protection circuit 103 coupled or capable of coupling to a battery (or battery pack) 101. Battery protection circuit 103 and/or battery pack 101 may determine whether to connect a battery cell in the battery pack 101 to the battery powered device (or apparatus 10) based on the current being drawn by the battery powered device from the battery pack 101 and based on a watchdog timer. In some embodiments, the watchdog timer is included in battery pack 101 and in some embodiments the watchdog timer is included in battery protection circuit 103.

Although the battery protection circuitry 103 is depicted separate from processor 20, in some example embodiments, the battery protection circuit 103 may be implemented at processor circuitry 20.

Moreover, although some of the examples disclosed herein refer to the battery protection circuitry 103 being used with user equipment, such as the apparatus 10, the battery protection circuitry 103 may be used with any other battery-powered device as well.

Before providing additional details regarding the battery protection circuitry 103 and battery pack 101, the following provides an example of an apparatus 10, which may be used in some embodiments.

The apparatus 10 may include at least one antenna 12 in communication with a transmitter 14 and/or a receiver 16. Alternatively transmit and receive antennas may be separate.

The apparatus 10 may also include a processor 20 configured to provide signals to and from the transmitter and/or receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 1 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as, a web browser. The connectivity program may allow the apparatus 10 to transmit and receive web content, such as location-based content, according to a protocol, such as, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 10 to receive data, such as, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to battery protection disclosed herein including the process flow of FIG. 4. The memories may comprise an identifier, such as, an international mobile equipment identification (IMEI) code, capable of uniquely identifying apparatus 10. In the example embodiment, the processor 20 may be configured using computer code stored at memory 40 and/or 42 to provide the operations disclosed with respect to the process shown in FIG. 4.

Figure 2:
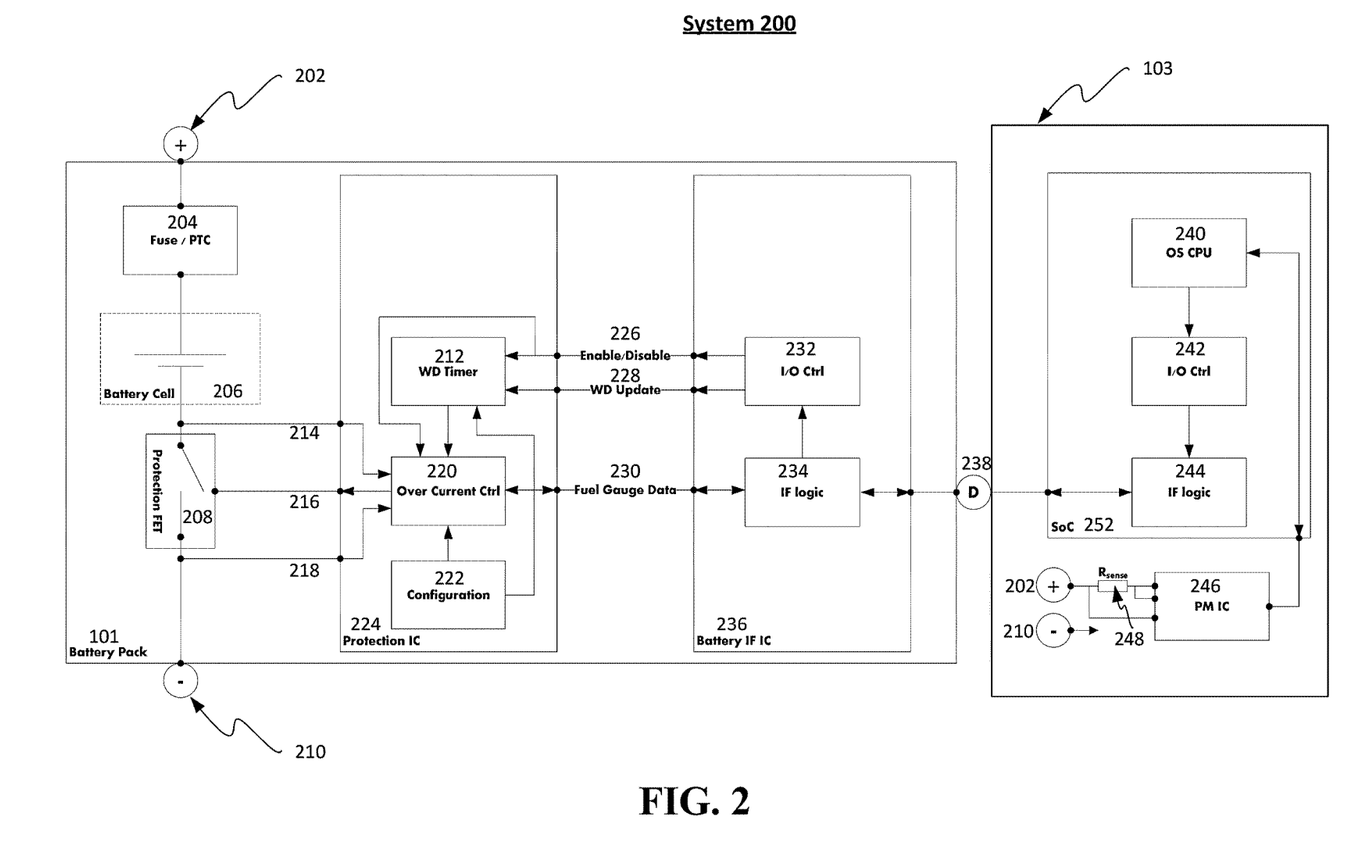
FIG. 2 depicts a schematic diagram of an apparatus for protecting battery-powered devices from over-current conditions, in accordance with some example embodiments.

FIG. 2 depicts an example block diagram of a system 200 for protecting a battery-powered device from over-current conditions, in accordance with some example embodiments. In some example embodiments, the system 200 may include a battery protection circuit 103 and a battery pack 101.

The battery protection circuit 103 may be included in a battery-powered device, such as battery-powered device 10, although battery protection circuit 103 may be included in any other battery-powered device to provide over-current protection and the like. In some example embodiments, battery protection circuit 103 may further include a system-on-chip 252 and power management integrated circuit 246. In some example embodiments, battery pack 101 may further include a power protection integrated circuit 224 and battery interface integrated circuit 236 to allow the connection/disconnection of battery cell 206 from the battery-powered device such as battery-powered device 10.

The battery pack 101 may, in some example embodiments, interface via interface logic 234 and data interface 238 to system-on-chip 252, which may control whether battery cell 206 is connected or disconnected to battery terminal 210. Battery pack 101 may include battery cell 206 connected in series with transistor 208 and/or fuse 204 to battery pack terminals 202 and 210. If very high current levels flowing into, or out of, battery cell 206 have caused fuse 204 to trigger or "blow" (for example, the fuse has become an open circuit) then battery cell 206 is disconnected from battery terminal 202 thus forcing the battery-powered device to be shut off until the fuse is replaced (or reset if a circuit breaker is used instead of a fuse). If protection transistor 208 is turned-off, battery cell 206 is disconnected from battery terminal 210 thus forcing the battery-powered device to be shut off until protection transistor 208 is turned on. In some embodiments, protection transistor 208 may be replaced with a mechanical switch such as a relay or another solid-state device.

In some example embodiments, protection integrated circuit 224 may control protection transistor 208. Protection integrated circuit 224 may include over current controller 220. Over current controller 220 may monitor the drain (or collector) voltage 214/218 as well as the source (or emitter) voltage 218/214. Over current controller 220 may control the protection transistor 208 by controlling the gate (or base) voltage 216 of protection transistor 208 relative to the source (or emitter) voltage. The gate-source (base-emitter) voltage required to turn-on and turn-off protection transistor 208 varies over temperature conditions and across production runs of protection transistor 208. Measuring the source (emitter) and drain (collector) voltages may allow for improved control of protection transistor 208. Protection integrated circuit 224 also includes watchdog timer 212 and configuration information 222.

In some example embodiments, watchdog timer 212 may control over circuit controller 220, and watchdog timer 212 may be contained in protection integrated circuit 224. Watchdog timer 212 may receive configuration information from configuration 222. This configuration information may include one or more watchdog timer durations, such as 2 seconds, 4 seconds, 6 seconds, and so on, although other values for the timer may be used as well. In some embodiments, when watchdog timer 212 expires at the end of a selected duration from the configuration information, watchdog timer 212 may cause over current controller 220 to disconnect battery cell 206 from the battery powered device via protection transistor 208. Watchdog timer 212 may thus be enabled and disabled via enable/disable 226. Watchdog timer 212 may be reset by watchdog update 228. For example, if watchdog timer 212 is configured for 4 seconds, a watchdog update signal may be applied after 0.1, 1, or 3.9 seconds causing the watchdog timer to reset to 4 seconds again. After being reset, the watchdog timer runs again for the configured time period (e.g., 4 seconds) or until another watchdog update signal or command resets watchdog timer 212. If no reset is applied at 228, after the configured time period, watchdog timer 212 may cause over current controller 220 to disconnect battery cell 206 from the battery-powered device via transistor 208.

In some example embodiments, protection integrated circuit 224 may provide fuel gauge information (for example, fuel gauge data 230) indicating the state of the charge in battery cell 206. The fuel gauge information may be provided to interface logic 234 in battery interface integrated circuit (Battery IF IC) 236. Input/output control (I/O Ctrl) 232 may provide a watchdog enable/disable 226 and watchdog update 228. Input/output control 232 may receive watchdog enable/disable 226 and watchdog update information from interface logic 234, which may be contained in battery interface integrated circuit (labeled Battery IF IC) 236. Battery interface integrated circuit 236 may provide another interface 238 accessible from the exterior of battery pack 101. And, interface 238 may couple to system-on-chip 252.

In some example embodiments, system-on-chip 252 may include interface (IF) logic 244 associated with interface 238, input/output control (I/O Ctrl) 242, and operating system central processing unit (OS CPU) 240. Through the various interfaces detailed above, operating system central processing unit 240 may provide periodic reset commands or signals to cause the reset of watchdog timer 212, allowing battery-powered device 10 to continue to operate without the battery being disconnected. If an error/bug, in executable instructions executed by OS CPU 240 or a hardware failure in the battery-powered device prevents the watchdog timer reset signal or command from being applied to watchdog timer 212, the battery-powered device will, in some example embodiments, be shut down. Shutting down the battery-powered device under these circumstances may prevent damage from occurring to the battery-powered device or injury to the user due to the hardware failure or the erroneous instructions executed by OS CPU 240.

In some example embodiments, the battery protection circuitry 103 at the battery-powered device may determine to send a reset signal or an enable signal via interface 238. The reset signal may comprise instructions or otherwise indicate that battery pack 101 should update watchdog timer 212. The enable signal may comprise instructions to enable watchdog timer 226. Interface logic 234 may then instruct I/O control 232 to apply watchdog update 228 or enable/disable 226 signals accordingly.

Battery-powered device may determine whether battery pack 101 supports an extended mode with an extended current threshold or a normal mode with a lower current threshold. Battery pack 101 may for example send a battery identifier or a battery type signal via interface 238 to the battery-powered device. Battery-powered device may determine the mode supported by the battery pack 101 based on the received battery identification and/or battery type information.

Figure 3:
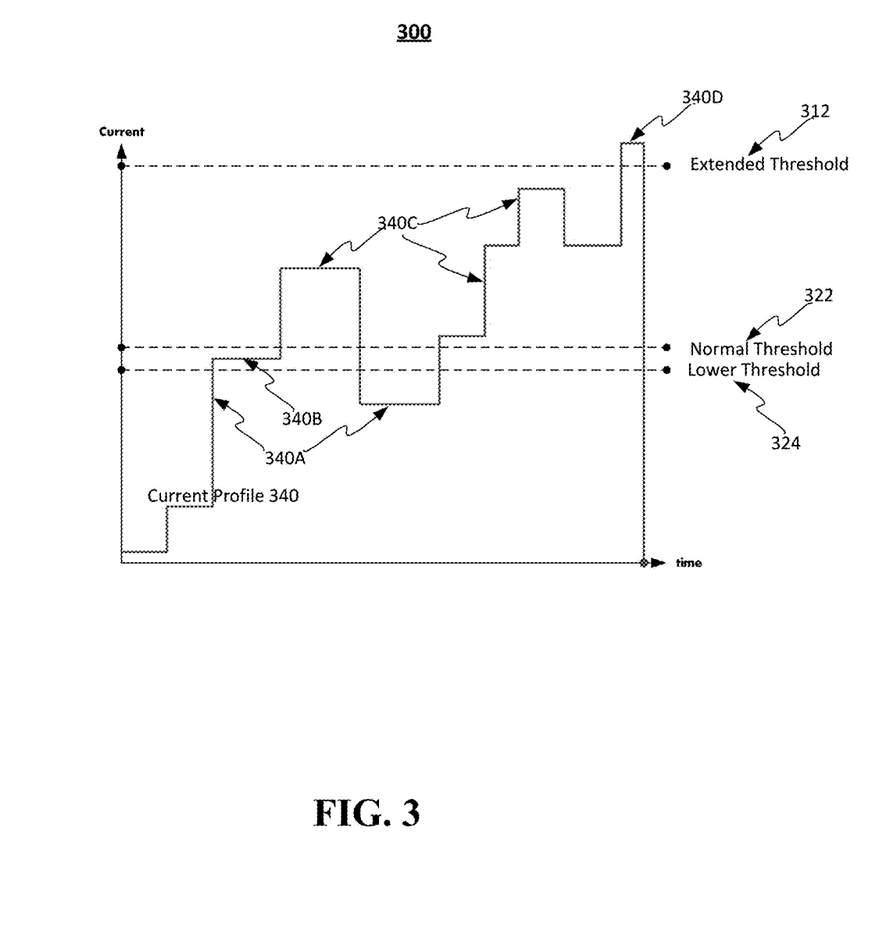
FIG. 3 depicts an example plot showing the current drawn by a battery-powered device, in accordance with some example embodiments.

FIG. 3 depicts an example of a plot 300 showing an electrical current drawn from a battery over a period of time. The system 200 in FIG. 2 may provide at least two current modes; a normal mode allowing a lower range of current levels, and extended mode allowing higher current levels to be drawn from the battery.

In normal mode, battery pack 101 and battery protection circuit 103, allow the battery-powered device to draw current without condition or restriction below a lower threshold 324 value. For example, over current control 220 of the protection integrated circuit 224 in FIG. 2 may allow the battery-powered device to draw current without condition or restriction below a lower threshold. Current values above the lower threshold value 324 but below a normal threshold 322 may be allowed subject to the watchdog timer not expiring. If the current value is above the lower threshold 324 but below the normal threshold 322 and the watchdog timer expires, the power supply to the battery-powered device may be terminated or the current to the battery-powered device may be restricted below the lower threshold. For example, over current control 220 may activate protection transistor 208 to disconnect battery cell 206 from battery terminal 210. If the watchdog timer is periodically reset so that it does not expire, current values between the lower threshold 324 and the normal threshold 322 may continue to be allowed. Current values above the normal threshold may not be allowed and may cause the over current control 220 to activate protection transistor 208 to disconnect battery cell 206 from battery terminal 210, or, to restrict the current supplied from battery pack 101 below the lower threshold.

In extended mode, instead of the upper current limit being the normal threshold 322, the upper limit may be an extended threshold 312. In the extended mode, apparatus 200 may allow the device to draw current without condition or restriction below a lower threshold 324. Current values above the lower threshold value 324 but below an extended threshold 324 may be allowed subject to the watchdog timer not expiring. If the current value is above the lower threshold value 322 but below the extended threshold 312 and the watchdog timer expires, power supply from battery pack 101 to the battery-powered device may be terminated or current supplied from the battery pack 101 to the battery-powered device may be restricted below the lower threshold. For example, over current control 220 may activate protection transistor 208 to disconnect battery cell 206 from battery terminal 210. If the watchdog timer is periodically reset so that it does not expire, current values between the lower threshold 324 and the extended threshold 312 may continue to be allowed. Current values above the extended threshold may not be allowed and may cause over current control 220 to activate protection transistor 208 to disconnect battery cell 206 from battery terminal 210.

In the example of FIG. 3, 340A shows a region below the lower threshold 324. In normal mode and extended mode, at the current levels in this region, the watchdog timer may be disabled. In this region, the device is drawing low levels of current that may be expected during normal operation of the battery-powered device.

In region 340B, the current is between the lower threshold 324 and the normal threshold 322. In normal mode and extended mode, the watchdog timer may be enabled. If the watchdog timer expires while the current is in this region, the power delivery from battery pack 101 may be terminated or restricted. If the watchdog timer is periodically reset so that it does not expire, current levels in region 340B may continue to be allowed.

In region 340C, the current is above the normal threshold value. If the device were in the normal mode instead of the extended mode, the power delivery from battery pack may be terminated or restricted because region 340C is above the normal threshold 322. The current profile 340 in FIG. 3 illustrates an example current profile in an extended mode (because current levels above the normal threshold 322 are allowed). In extended mode, the watchdog timer may be enabled. The current values shown in 340C may be allowed unless the watchdog timer expires.

In region 340D, the current is above the extended threshold. In both the normal mode and in the extended mode, current at and above the extended threshold are not allowed and cause the power delivery from battery pack 101 to be terminated or restricted. This is shown in FIG. 3 as the current dropping to zero just beyond the time when the current profile 340 exceeds extended threshold 340D.

Although FIG. 3 depicts an example plot, other forms and profiles of plots may be realized as well.

Figure 4:
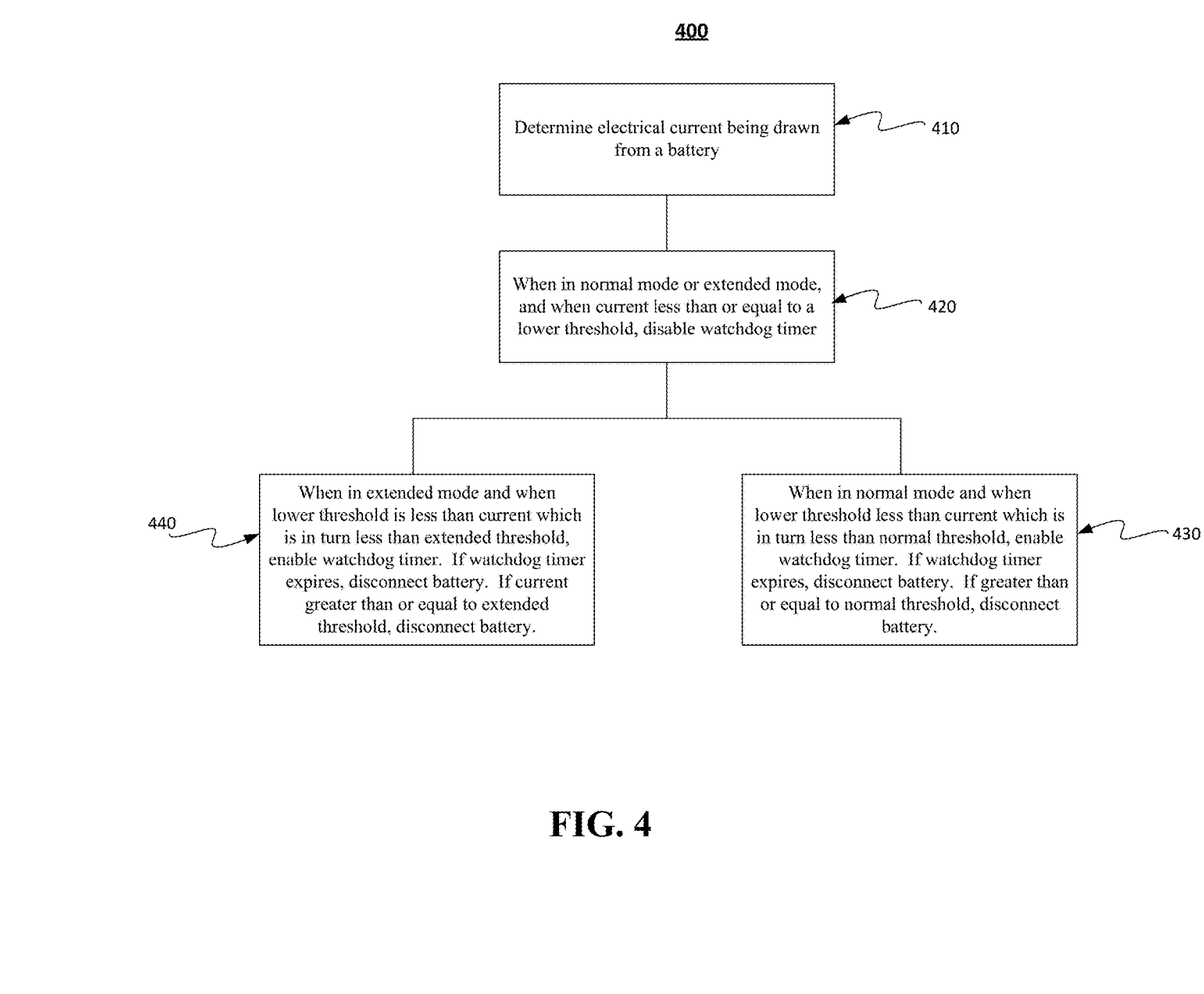
FIG. 4 depicts process for protecting battery-powered devices from over-current conditions, in accordance with some example embodiments.

FIG. 4 depicts a process 400 for protecting battery-powered devices from over-current conditions, in accordance with some example embodiments. At 410, the electrical current drawn by a device may be determined. When the device is in normal mode 420, the current level, the normal threshold 322 and the watchdog timer 212 may determine whether the battery is connected or disconnected from the battery-powered device. When the device is in extended mode 430, the current level, the extended threshold 312, and the watchdog timer 212 may determine whether the battery is connected or disconnected from the battery-powered device.

At 410, the electrical current drawn by the battery-powered device may be determined, in accordance with some example embodiments. For example, the current may be determined by a power management integrated circuit and sensing resistor, such as the FIG. 2 power management integrated circuit 246 and resistor 248. In some example embodiments, the current flowing out of the battery through a resistor, such as resistor 248, may be determined by measuring the voltage across the resistor, although other methods may also be used to determine the current flowing out of a battery. In some embodiments, the current flowing out of battery cell 206 may be determined inside battery pack 101. Resistor 248 may be located inside battery pack 101, for example, in series with transistor 208 and/or fuse 204 to battery pack terminals 202 and 210. Over current control 220 may determine current flow through resistor 248, for example, by measuring the voltage across the resistor or by other methods.

At 420, if the current determined at 410 is less than or equal to a lower threshold value, the watchdog timer may be disabled, in accordance with some example embodiments. At current levels below the lower threshold value, the battery may be connected to the battery-powered device, as normal. At these current levels, the battery-powered device will not overheat or cause injury. In some example embodiments, the power level may be used to identify problems with the device, possibly even specifically identifying a problem if certain failures are known to cause particular current levels.

At 430, the battery-powered device may be in the normal mode, in accordance with some example embodiments. If the current is above the lower threshold, such as lower threshold 324, but below the normal threshold 322, the watchdog timer may be enabled by a command or signal such as enable/disable signal 226. If the watchdog timer expires, protection transistor 208 may disconnect battery cell 206 from the battery-powered device. If the current rises above the normal threshold, the battery may be disconnected form the battery-powered device independently of the watchdog timer.

To prevent the watchdog timer from expiring, the battery-powered device may, in some example embodiments, reset the watchdog timer periodically. For example, the watchdog timer may be reset by a signal such as watchdog update signal 228. The watchdog timer may run for a predetermined amount of time before expiring. The battery-powered device may operate while the timer is running but if the timer expires, the battery-powered device may be disconnected from the battery. In some example embodiments, the watchdog timer is reset via a signal, such as watchdog update signal 228. When reset, the watchdog timer may be set to a predetermined but configurable starting value such as, for example, 2 seconds. In this example, if two seconds pass without the update signal 228 resetting the watchdog timer, the watchdog timer expires causing the battery pack 101 to be disconnected from, for example, battery-powered device 10. In this example, if the battery-powered device resets the watchdog timer before it expires, another 2 seconds may pass before the watchdog timer may time-out. In this way, the battery-powered device must periodically reset the watchdog timer to prevent the battery from being disconnected from the battery-powered device. If the battery-powered device "crashes," "freezes," "locks-up," or otherwise fails, the periodic reset signal, such as watchdog update 228, may stop causing the watchdog timer to expire and the battery to be disconnected from the battery-powered device. This may prevent overheating and potential injury to the user.

At 440, the battery-powered device may be in the extended mode, in accordance with some example embodiments. If the current determined at 410 is less than or equal to the lower threshold, the watchdog timer 212 may be disabled and the battery-powered device operates normally. If the current is above the lower threshold, such as lower threshold 324, but below the extended threshold 322, the watchdog timer may be enabled by a command or signal such as enable/disable signal 226. The watchdog timer may operate as described above but use the extended threshold as the limiting value. As long as the watchdog timer is periodically reset by a command or signal such as watchdog update 228, the battery-powered device may remain connected to the battery pack 101. If the watchdog timer expires or the current level rises above the extended threshold, protection transistor 208 may disconnect battery cell 206 from the battery-powered device.

In some example embodiments an apparatus comprises means for disabling a timer, when a current drawn from a battery is one of below and equal to a lower current threshold, wherein the disabled timer allows the battery to remain connected, means for enabling the timer, when the current drawn from the battery is greater than the lower current threshold and less than an extended current threshold, wherein the enabled timer allows the battery to remain connected until the timer expires; and means for disconnecting the battery, when the timer expires or the current drawn from the battery exceeds the extended current threshold.

In some example embodiments a method comprises determining to send at least one reset signal comprising instructions to reset a timer at a battery pack, and/or determining to send at least one enable signal comprising instructions to enable the timer at the battery pack, and/or wherein determining to send the reset signal or the enable signal comprises determining whether the battery pack supports an extended current mode or a normal current mode, and wherein the enable signal or the reset signal is sent if the battery pack supports the extended current mode.

Some of the embodiments disclosed herein may be implemented in software, hardware, application logic, or a combination of software, hardware, and application logic. The software, application logic, and/or hardware may reside in memory 40, the control apparatus 20, protection integrated circuit 224, operating system central processing unit 240, or electronic components disclosed herein, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 1. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIG. 4 and/or the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, WiFi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   disabling, at a battery pack, a timer, when a current drawn from a battery by a battery-powered device is one of below and equal to a lower current threshold, wherein the disabled timer allows the battery to remain connected;
   enabling the timer, when the current drawn from the battery by the battery-powered device is greater than the lower current threshold and less than an extended current threshold, wherein the enabled timer allows the battery to remain connected to the battery-powered device until the timer expires;
   determining, by the battery-powered device, to periodically send at least one reset signal comprising instructions to reset the timer at the battery pack via an interface between the battery pack and the battery-powered device;
   resetting, based on a first received indication, the timer to prevent the expiration of the timer, wherein the first received indication comprises a reset signal received from the battery-powered device via the interface between the battery pack and the battery-powered device; and
   disconnecting, by the battery pack, the battery when the timer expires or the current drawn from the battery exceeds the extended current threshold, wherein the extended current threshold comprises a first current limit in a first mode and a second current limit in a second mode, and wherein a mode supported by the battery pack is determined by the battery-powered device based on information received from the battery pack.

2. The method of claim 1 further comprising:
   enabling the timer, when the current drawn from the battery is greater than the lower current threshold and less than a normal current threshold, wherein the enabled timer allows the battery to remain connected until the timer expires; and
   disconnecting the battery, when the timer expires or the current drawn from the battery exceeds the normal current threshold.

3. The method of claim 1, wherein the first received indication represents use of an apparatus drawing current from the battery.

4. The method of claim 1, further comprising disabling the timer based on a second received indication.

5. An apparatus comprising:
   at least one processor; and
   at least one memory including computer program code, the at least one processor, the at least one memory, and the computer program code configured to cause the apparatus to at least:
   disable, at a battery pack, a timer, when a current drawn from a battery by a battery-powered device is one of below and equal to a lower current threshold, wherein the disabled timer allows the battery to remain connected;
   enable the timer, when the current drawn from the battery by the battery-powered device is greater than the lower current threshold and less than an extended current threshold, wherein the enabled timer allows the battery to remain connected to the battery-powered device until the timer expires;

determine, by the battery-powered device, to periodically send at least one reset signal comprising instructions to reset the timer at the battery pack via an interface between the battery pack and the battery-powered device;

reset, based on a first received indication, the timer to prevent the expiration of the timer, wherein the first received indication comprises a reset signal received from the battery-powered device via the interface between the battery pack and the battery-powered device; and disconnecting, by the battery pack, the battery when the timer expires or the current drawn from the battery exceeds the extended current threshold, wherein the extended current threshold comprises a first current limit in a first mode and a second current limit in a second mode, and wherein a mode supported by the battery pack is determined by the battery-powered device based on information received from the battery pack.

6. The apparatus of claim 5, wherein the apparatus is further configured to at least:

enable the timer, when the current drawn from the battery is greater than the lower current threshold and less than a normal current threshold, wherein the enabled timer allows the battery to remain connected until the timer expires; and disconnect the battery, when the timer expires or the current drawn from the battery exceeds the normal current threshold.

7. The apparatus of claim 5, wherein the first received indication represents a battery-powered device drawing current from the battery.

8. The apparatus of claim 5, wherein the apparatus is further configured to at least disable the timer based on a second received indication.

9. A non-transitory computer-readable medium encoded with instructions that, when executed by at least one processor, perform at least the following:

disabling, at a battery pack, a timer, when a current drawn from a battery by a battery-powered device is one of below and equal to a lower current threshold, wherein the disabled timer allows the battery to remain connected;

enabling the timer, when the current drawn from the battery by the battery-powered device is greater than the lower current threshold and less than an extended current threshold, wherein the enabled timer allows the battery to remain connected to the battery-powered device until the timer expires;

determining, by the battery-powered device, to periodically send at least one reset signal comprising instructions to reset the timer at the battery pack via an interface between the battery pack and the battery-powered device;

resetting, based on a first received indication, the timer to prevent the expiration of the timer, wherein the first received indication comprises a reset signal received from the battery-powered device via the interface between the battery pack and the battery-powered device; and disconnecting, by the battery pack, the battery when the timer expires, or the current drawn from the battery exceeds the extended current threshold, wherein the extended current threshold comprises a first current limit in a first mode and a second current limit in a second mode, and wherein a mode supported by the battery pack is determined by the battery-powered device based on information received from the battery pack.

10. The non-transitory computer-readable medium of claim 9 further comprising:

enabling the timer, when the current drawn from the battery is greater than the lower current threshold and less than a normal current threshold, wherein the enabled timer allows the battery to remain connected until the timer expires; and disconnecting the battery, when the timer expires or the current drawn from the battery exceeds the normal current threshold.

11. The non-transitory computer-readable medium of claim 9, wherein the received indication represents use of an apparatus drawing current from the battery.

12. The non-transitory computer-readable medium of claim 9 further comprising disabling the timer based on a second received indication.

* * * * *